US011262635B1

United States Patent
Daniels et al.

(10) Patent No.: US 11,262,635 B1
(45) Date of Patent: Mar. 1, 2022

(54) MAGNET ERASED EWRITER

(71) Applicant: Kent Displays, Inc., Kent, OH (US)

(72) Inventors: Anthony Daniels, Kent, OH (US); Todd Ernst, Kent, OH (US); Nathan Hirt, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 17/168,507

(22) Filed: Feb. 5, 2021

(51) Int. Cl.
*G02F 1/137* (2006.01)
*G02F 1/1333* (2006.01)
*B43L 1/00* (2006.01)
*G02F 1/135* (2006.01)

(52) U.S. Cl.
CPC .......... *G02F 1/13718* (2013.01); *B43L 1/008* (2013.01); *G02F 1/1351* (2021.01); *G02F 1/13338* (2013.01); *G02F 2202/022* (2013.01); *G02F 2203/026* (2013.01)

(58) Field of Classification Search
CPC .............. G02F 1/13718; G02F 1/1351; G02F 1/13338; G02F 2202/022; G02F 2203/026; B43L 1/008
USPC ........................................................ 349/12
See application file for complete search history.

(56) References Cited

U.S. PATENT DOCUMENTS

| | | | |
|---|---|---|---|
| 6,104,448 A | 8/2000 | Doane et al. | |
| 8,139,039 B2 | 3/2012 | Schneider et al. | |
| 8,228,301 B2 | 7/2012 | Schneider et al. | |
| 9,927,672 B2 | 3/2018 | Braganza et al. | |
| 9,946,106 B2 | 4/2018 | Braganza et al. | |
| 10,558,065 B2 | 2/2020 | Marhefka et al. | |
| 2010/0265214 A1* | 10/2010 | Green | G06F 3/045 345/174 |
| 2013/0009907 A1* | 1/2013 | Rosenberg | G06F 3/04186 345/174 |
| 2019/0056611 A1* | 2/2019 | Marhefka | G02F 1/13718 |

* cited by examiner

*Primary Examiner* — Charles S Chang
(74) *Attorney, Agent, or Firm* — Serbinowski PLLC

(57) ABSTRACT

A magnet erased writing device or eWriter includes cholesteric liquid crystal material, in which a written image is erased using magnetically activated electronic circuitry. By eliminating the mechanical erase button of Prior Art eWriters, the eWriter can be designed with a display footprint that can cover nearly the entire face of the eWriter. An erasing magnet can be used with the device, which can be handheld as, for example, by being part of a stylus. With the erasing magnet separated from the device and the mechanical erase button being omitted, the eWriter avoids unintentional erasures, a drawback of Prior Art eWriters.

19 Claims, 4 Drawing Sheets

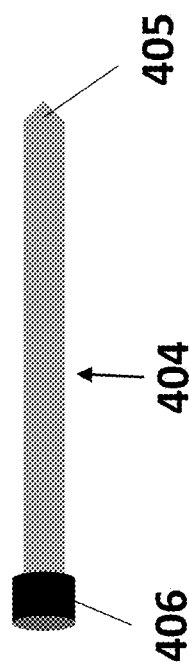
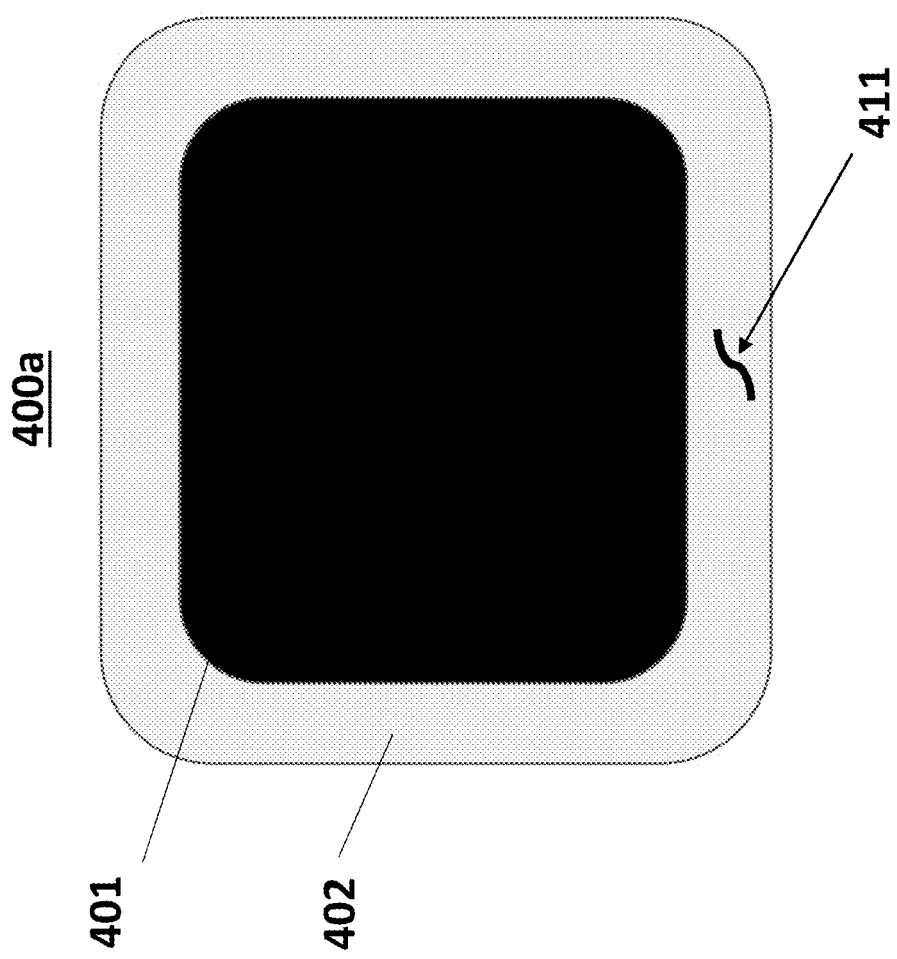
Figure 4B
Figure 4A

MAGNET ERASED EWRITER

TECHNICAL FIELD

This disclosure relates generally to cholesteric liquid crystal pressure sensitive imaging devices.

BACKGROUND

Cholesteric liquid crystal eWriters were introduced into the commercial market in 2010 as a paper replacement. Developed and introduced by Kent Displays, Inc. under the name BOOGIE BOARD® eWriters, these devices provide the writing experience and feel of writing on paper. Cholesteric liquid crystal eWriters offer a considerable improvement over digital tablet technologies in that eWriters are lighter in weight, offer the feel of writing on paper and are low cost, not requiring expensive digital electronics or a backlight to display an image. Like paper, eWriters deliver a written image that lasts indefinitely without applied power. eWriters have found a wide variety of uses, including jotting notes as reminders or for messages to others, business and other activities and as toys. In education, eWriters are particularly useful for teaching young children to draw and write. Such an eWriter 100 is illustrated in FIG. 1. The cholesteric liquid crystal display 101 provides a pressure sensitive writing surface in which a user can write an image with a pointed solid object such as a stylus or a fingernail. The image written on the display is erased with the simple push of a button 103 enabling the writing device to be reused repeatedly thousands of times avoiding the waste and inconvenience involved in writing with paper. Pushing the button 103 closes a mechanical switch activating electronic circuitry, concealed in housing 102, erasing an image and initiating the display for another image.

While eWriters have been a commercial success, there have been drawbacks with the button erase mechanism. The footprint of the mechanical erase button switch and associated electronics takes up considerable space on the eWriter that could otherwise be used for a larger display.

Also, the erase button can be pushed by accident which can easily happen and often does at an awkward time. This is particularly frustrating when one is in the midst of tracing or drawing an elaborate picture or at a time when an important phone number, name or idea is jotted down on the device. Also, being mechanical, the button switch is subject to failure after many uses. To eliminate these drawbacks disclosed is an eWriter with a different erase mechanism.

SUMMARY OF THE DISCLOSURE

A magnet erased writing device or eWriter is disclosed, which overcomes problems encountered in Prior Art eWriters described above. Instead of a mechanical button, the eWriter is erased when a magnet touches or is placed in proximity to the eWriter to activate magnetically activated electronic erase circuitry. The magnet can be a very small, handheld magnet. A significant feature of this disclosure is that the magnet, or handheld instrument containing the magnet, can be entirely separate from the eWriter itself. This disclosure eliminates the mechanical erase button of Prior Art eWriters to be replaced by an external magnet and magnetically activated electronic circuitry used for erasing and disposed inside the eWriter housing, allowing for the display footprint to be substantially larger. Without using the mechanical switch for erasing, the eWriter can be made more rugged. Further, the removal of the mechanical erase button prevents unintended erasures that often happen in Prior Art eWriter devices when the user accidentally bumps or touches the button thereby erasing needed information or drawings written on the eWriter. In addition, the users can write a message on the eWriter for themselves or others without concern that someone can easily or accidentally erase it. The eWriter, left by itself, without a magnet, cannot be erased. The eWriter can thus be used more confidently and reliably, such as for business or other valuable written information. The magnet can be small enough to be, for example, located on the end of a stylus opposite the end of the pointed tip used for writing on the eWriter. Similar to a pencil, the stylus can write an image using one end of the stylus and erase the image with the other end by touching or bringing the magnet in close proximity to the location of a magnetically activated switch housed within the eWriter. The magnet does not have to be part of a stylus but could be a separate unit.

In a first general aspect of the disclosure, a writing device includes the following elements. A liquid crystal layer includes cholesteric liquid crystal material. There are electrically conductive layers between which the liquid crystal layer is disposed. There are a flexible substrate and a back substrate, between which the electrically conductive layers and the liquid crystal layer are disposed. The cholesteric liquid crystal material forms a reflective texture by application of pressure to the flexible substrate. Magnetically activated electronic circuitry applies a voltage to the electrically conductive layers to form a see-through texture of the cholesteric liquid crystal material.

Referring to more specific features of the first aspect, the features able to be used in any combination, a first feature is that the flexible substrate is transparent.

In another feature the back substrate is opaque or semi-transparent.

In yet another feature the back substrate is flexible.

A further feature is wherein the back substrate is transparent.

Another feature is a writing device including a light absorbing layer disposed adjacent to the back substrate. In another feature, the light absorbing layer is opaque or semitransparent.

A further feature is wherein the magnetically activated electronic circuitry comprises a magnetically activated switch. A still further feature is wherein the device comprises a magnet that activates the magnetically activated electronic circuitry. In yet another feature the magnet is untethered and external relative to the flexible substrate. Referring to the immediately previous feature, the writing device includes a hand held device to which the magnet is attached or forms a part thereof. In another feature the hand held device is a stylus.

In another feature the magnet is a permanent magnet or an electromagnet.

In yet another feature the writing device includes a housing that conceals the magnetically activated electronic circuitry. Another feature is wherein the magnetically activated electronic circuitry is activated by a magnet touching or brought in proximity to the housing. Alternatively, a feature is wherein the magnetically activated electronic circuitry is activated by a magnet touching or brought in proximity to the flexible substrate.

In another feature the cholesteric liquid crystal material includes polymer dispersed cholesteric liquid crystal.

Another specific feature of the first aspect is directed to a stacked writing device including a second liquid crystal layer including cholesteric liquid crystal material stacked relative to the liquid crystal layer. There are second electrically conductive layers between which the second liquid crystal layer is disposed. The cholesteric liquid crystal material of the second liquid crystal layer forms a reflective texture by application of pressure to the flexible substrate. The electronic circuitry applies a voltage to the second electrically conductive layers to form the see-through texture of the cholesteric liquid crystal material of the second liquid crystal layer.

It should be understood that the above Summary of the Disclosure describes embodiments of the disclosure in broad terms while the following Detailed Description describes embodiments of the disclosure more narrowly and presents specific embodiments that should not be construed as necessary limitations of the disclosure as broadly defined in the claims. Many additional features, advantages and a fuller understanding of the disclosure will be had from the accompanying drawings and the Detailed Description that follows.

BRIEF DESCRIPTION OF THE FIGURES

FIG. 4A: Illustration in front view of a magnet erased eWriter prototype of this disclosure; and FIG. 4B: Handheld magnet for erasure of an image on the magnet erased eWriter of FIG. 4A, in this example the magnet being attached to a stylus for writing on the eWriter.

DETAILED DESCRIPTION

Figure 1:
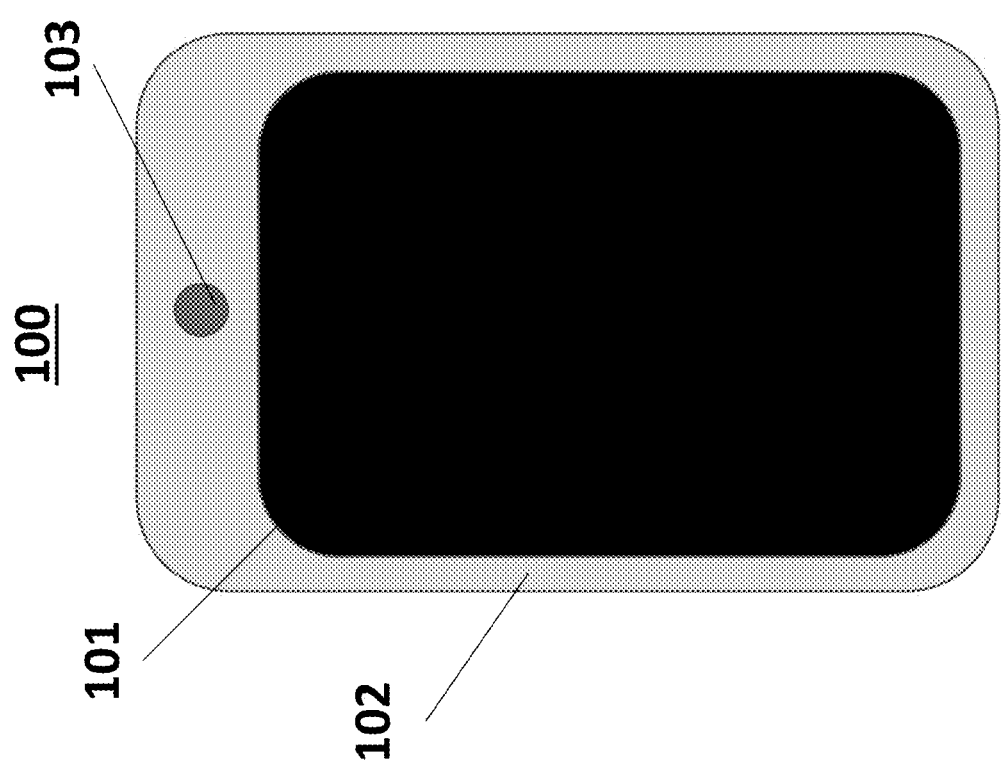
FIG. 1: Illustration of a cholesteric liquid crystal eWriter of the Prior Art.

A magnet erased eWriter 200 is illustrated in FIG. 2A. The components of the magnet erased eWriter 200 comprise magnetically activated electronic circuitry 220 and a pressure sensitive cholesteric liquid crystal display 201a that is erased by the magnetically activated electronic circuitry 220. The pressure sensitive cholesteric liquid crystal display 201a includes cholesteric liquid crystal material of liquid crystal layer 213 confined between two substrates, a flexible substrate 210 (front substrate) and a back substrate 214. Both substrates are coated or otherwise support electrically conductive layers or electrodes 212 adjacent to the liquid crystal layer 213 that is sandwiched in between. The electrically conductive layers 212 may be spaced to a particular cell gap using polymeric spacers as known in the art. The cholesteric liquid crystal material of the liquid crystal layer 213 can include polymer dispersed cholesteric liquid crystal as is known in the art (U.S. Pat. No. 8,139,039 or 6,104,448, incorporated herein by reference) and/or typically used. The back substrate 214 can be transparent to support or expose a light absorbing layer 215 located behind the back substrate 214, which is opaque and provides a dark background. Another option is that the back substrate 214 is transparent and the light absorbing layer 215 located behind the back substrate 214, is semitransparent (U.S. Pat. No. 9,946,106, incorporated by reference herein). Alternatively, the back substrate 214 itself can be either opaque or semitransparent to form the background, replacing the light absorbing layer 215, of the display. The flexible substrate 210 and at least the front electrodes 212 are transparent to observe the image created by the cholesteric liquid crystal material of the liquid crystal layer 213. In one example the back electrodes 212 can also be transparent to observe the background formed by the light absorbing layer 215.

The image is formed by two optically contrasting textures of the cholesteric liquid crystal material of the liquid crystal layer 213, such as described in U.S. Pat. No. 6,104,448. One of these textures is a bright light reflective texture, known in the art as the planar texture or reflective texture. The other texture is a light scattering texture known as the focal conic texture that can be seen through (a see-through texture) to expose the background formed by the light absorbing layer 215 underneath. The light absorbing layer 215 is usually black or dark in color contrasting with the bright reflective color of the reflective texture to create an image. The liquid crystal layer 213 can also be multicolored (U.S. Pat. No. 9,927,672, incorporated by reference).

The pressure sensitive cholesteric liquid crystal display 201a is erased by the magnetically activated electronic circuitry 220 comprising erase electronics 208 activated by a magnetically activated switch 211a, both of which are powered by a power source 207. The magnetically activated switch 211a can be, for example, Texas Instruments DRV5032FC, which makes an electrical signal to activate erase electronics 208 when a magnet (not shown in FIG. 2A or FIG. 2B) is brought within close proximity to the magnetically activated switch 211a. The magnet can be a permanent magnet, an electromagnet or combination of the two. The erase electronics 208 provide an erase voltage to electrically conductive layers 212. The erase voltage can be that which provides slow discharge erase as disclosed in U.S. Pat. No. 10,558,065 (incorporated herein by reference) or it can be a pulse or sequence of pulses as disclosed in the same patent and known in the art. The erase electronics 208, magnetically activated switch 211a, and battery 207 can be concealed within a housing 202. The magnetically activated switch 211a can be disposed at any location within the housing 202, located either behind display 201a or beside display 201a as illustrated, for example, in FIG. 2B. The location 211b may have indicia put on the housing or flexible substrate indicating that this is the location where the magnet should be placed to bring about erasing. The magnetically activated switch 211a is activated by touching or bringing a magnet in proximity to the location 211b of the magnetically activated switch. The magnetic field provided by the magnet is sufficient to activate the magnetically activated switch 211a. The pressure sensitive cholesteric liquid crystal display 201a is presented as a screen 201b in FIG. 2B. The screen 201b provides a writing surface on which pressure can be applied to the flexible substrate 210 to change the cholesteric liquid crystal to the planar texture (reflective texture) against background seen through the focal conic texture (see-through texture) for forming the image. Activating the magnetically activated switch 211a initializes the pressure sensitive cholesteric liquid crystal display 201a to the focal conic texture, erasing all images. Typically, the magnetically activated erase electronics 220 initialize the eWriter by applying voltage pulses, as described above, to the electrically conductive layers 212 electrically driving the cholesteric liquid crystal material of the liquid crystal layer 213 to the see-through or focal conic texture. In this texture, one observes the background of the display provided, for example, by the light absorbing layer 215. If the background is black the entire display as initialized appears black as illustrated by the screen 201b of FIG. 2B.

When one presses on the flexible substrate 210 (front substrate) with a pointed stylus or fingernail, the liquid crystal is locally displaced causing the liquid crystal to flow, which changes it to the highly visible, bright, color reflective planar texture at the location of the stylus. Areas of the screen where pressure is not applied remain in the focal conic texture. The reflective color contrasts well with the dark background observed through the focal conic texture, creating an image written by the stylus or fingernail. Like writing on paper, the image will remain indefinitely. The image is erased by touching or placing a magnet in close proximity where magnetically activated switch 211a is located, either behind display 201a or beside display 201a such as indicated by indicia 211b illustrated, for example, in FIG. 2B. That is, the switch 211a can be concealed in the housing such as indicated beneath an outer face of the housing 202 at location 211b. The magnetically activated switch 211a activates the erase electronics 208 producing an erase voltage to the electrodes 212 thereby erasing the image as well as initializing the display for a new image. The distance by which the magnet can be positioned from the housing surface at or near location 211b (and 411, FIG. 4A) depends on the extent of the magnetic field produced by the magnet sufficient to activate the magnetically activated switch 211a through the portion of the eWriter device concealing the magnetically activated switch. For example, the magnetically activated switch 211a can be located such that touching the flexible substrate 210 with the magnet near the location of the switch will activate the magnetically activated switch 211a.

For convenience, a magnet to activate the magnetically activated switch 211a may be formed as a part of or affixed to a handheld object. The object may be a stylus 404 (FIG. 4B) with a pointed end or tip 405 for writing on the pressure sensitive cholesteric liquid crystal display 201a or it may be any other object such as on a wrist watch that could be of convenience. The magnet 406 can be disposed on the end of the stylus 404 opposite to the tip 405. Also, the magnet may be stand alone, unattached to any object (e.g., untethered and external to the flexible substrate 210).

Figure 2:
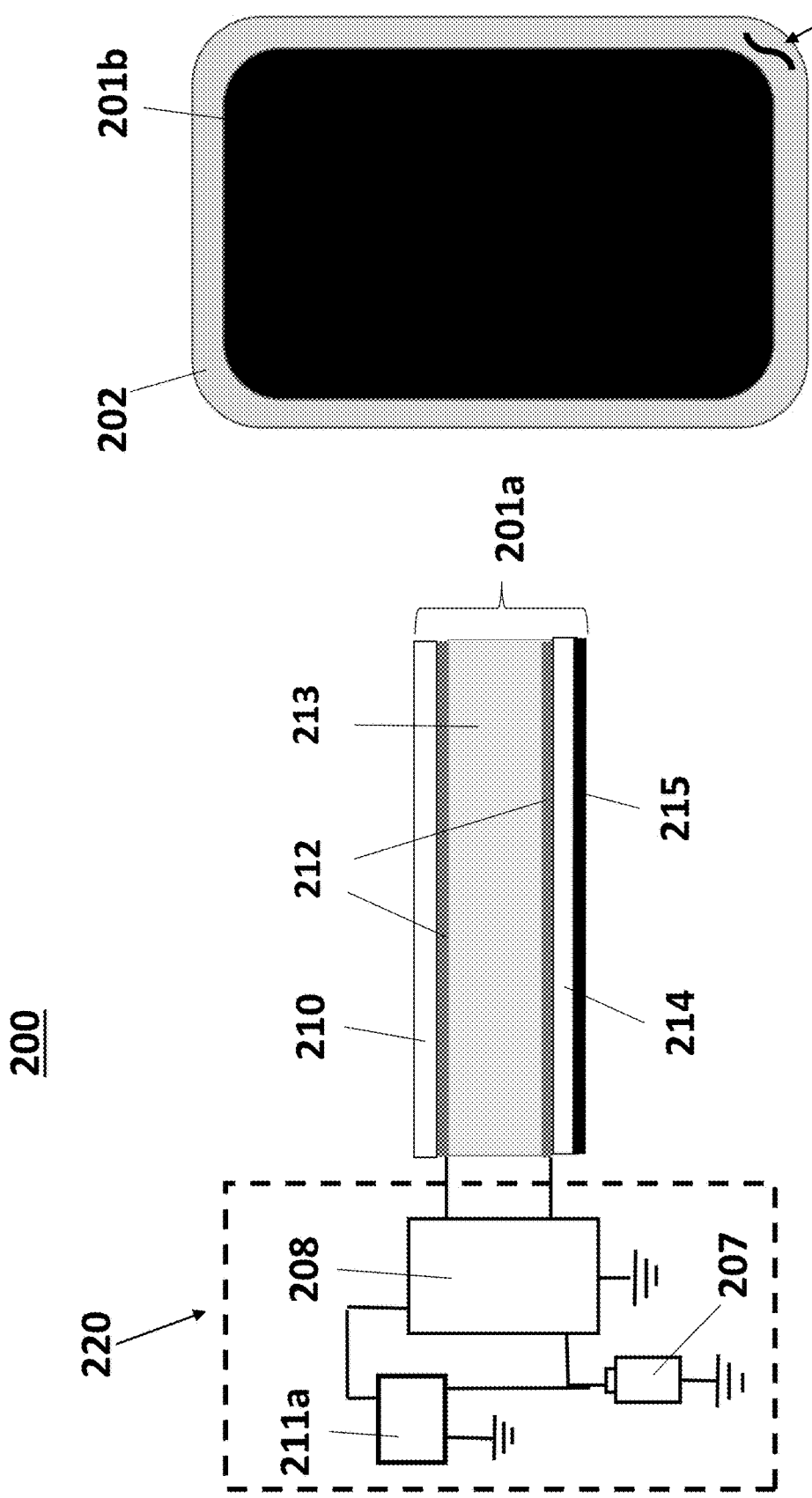
FIG. 2A: Schematic diagram in side view illustrating a magnet erased eWriter and its components of this disclosure.
FIG. 2B: Front view illustration of the eWriter of FIG. 2A.
Figure 3:
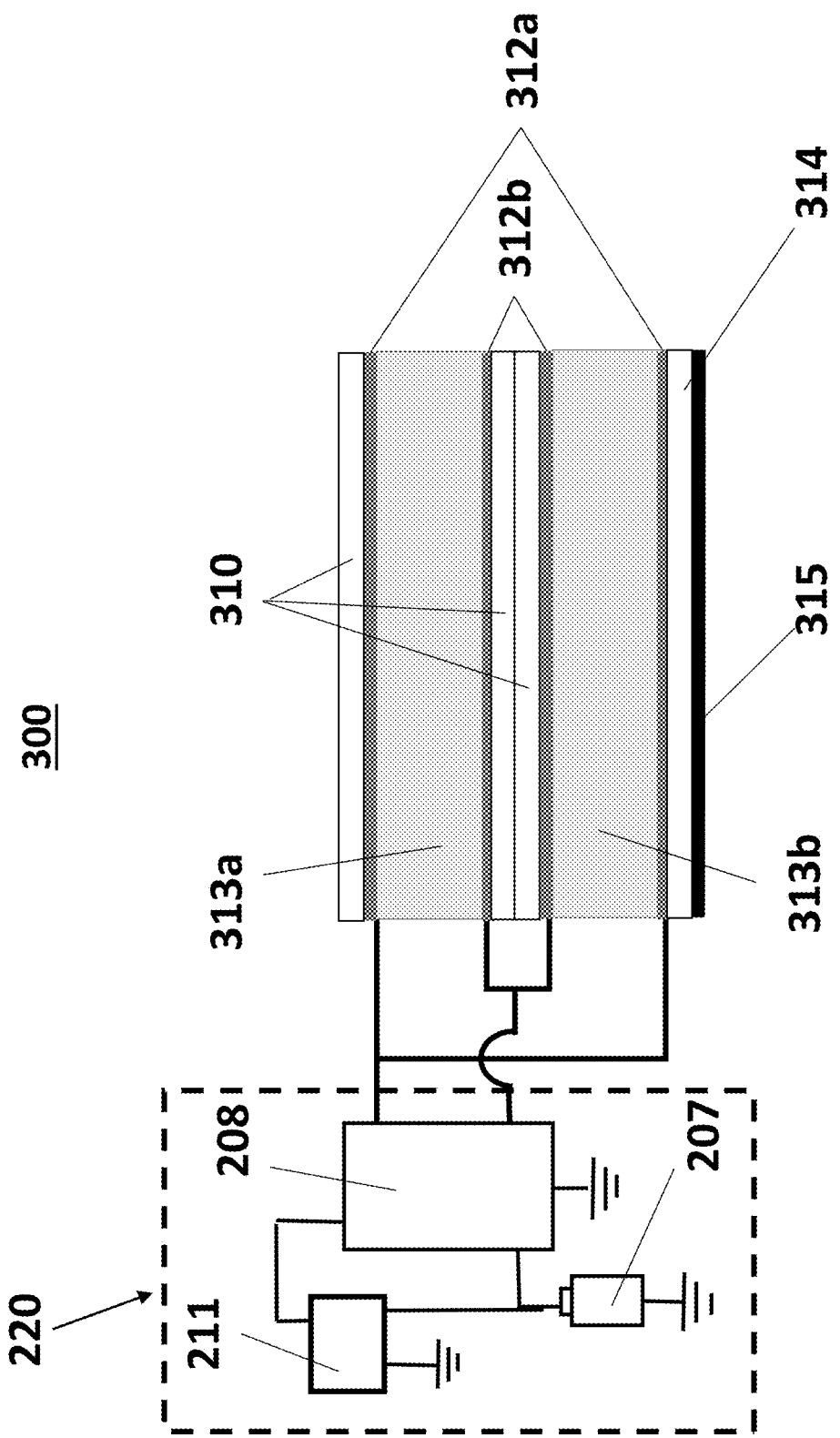
FIG. 3: Illustration in side view of a stacked magnet erased eWriter of another embodiment of the disclosure.

An embodiment in which the cholesteric liquid crystal display may be a stacked display to provide for a brighter display or for a display of a different color, such as white, is disclosed by U.S. Pat. Nos. 8,139,039 and 8,228,301, which are incorporated herein by reference. FIG. 3 illustrates a double stacked eWriter 300 that includes stacked liquid crystal layers 313a and 313b of cholesteric liquid crystal material where cholesteric liquid crystal layers 313a and 313b differ in reflective chirality (one left and other right) or differ in reflective color, or both. The cholesteric liquid crystal material comprises a polymer dispersed cholesteric liquid crystal. In the stacked structure, substrates 310 are all flexible and sufficiently transparent to observe the liquid crystal layers 313a and 313b and light absorbing layer 315 or other layer that can provide a background that is black, gray, colored, multicolored or semitransparent. Back substrate 314 can be transparent to observe the background provided by the light absorbing layer 315 or it can be semitransparent for other desired effects (U.S. Pat. No. 9,946,106). Back substrate 314 can serve as the background by being opaque or semitransparent, avoiding the need for the light absorbing layer 315 or other layer. Electrically conductive layers 312a, 312b are formed on or otherwise supported by the substrates 310, 314. The magnetically activated erase electronics 220 may be identical to that used for a single substrate eWriter 200 of FIG. 2, for applying an erase voltage to combined electrically conductive layers 312a and combined electrically conductive layers 312b. The magnetically activated erase electronic circuitry of FIG. 2 may also be used to erase a triple stack system wherein the eWriter may include a triple stack of liquid crystal layers (see U.S. Pat. No. 8,228,301 incorporated herein by reference) with the electrically conductive layers appropriately combined to be driven by two connections to erase electronics 208.

The disclosure now addresses an Example, which is presented to improve understanding of the disclosure and should not be used to limit the disclosure as set forth in the claims.

EXAMPLE

A working magnet erased eWriter prototype was constructed. The prototype was made by modifying a commercially available Boogie Board Dash™ (WT18234) eWriter of Kent Displays, Inc. by developing erase electronics to include a magnetically activated switch and eliminating the button and associated mechanical erase switch. Magnetic erase circuitry of the Boogie Board Dash™ (WT18234) eWriter was modified to be as illustrated in FIG. 2 comprising: a power source, 207, CR2025 battery; a magnetically activated switch 211a, Texas Instruments DRV5032FC; erase circuitry 208 of Kent Displays Boogie Board Dash™, WT18234 eWriter with the erase button disengaged by removing the tact switch from electronics and fixing the button in the housing in place. The pressure sensitive cholesteric liquid crystal display 201a was that of the Kent Displays, Inc. Boogie Board Dash™, WT18234 eWriter product 400a (FIG. 4A). Illustrated in FIGS. 2A and 4A, the magnetic switch 211a is concealed within the housing 402 located at position 411 of the modified Boogie Board Dash™ eWriter product 400a (the pressure sensitive cholesteric liquid crystal display 201a also being disposed in the housing, exposing screen 401). The magnet 406 used to activate the magnetically activated switch 211a was a ¼ inch diameter×¹⁄₁₆ inch thick N42 Grade Neodymium permanent magnet, although a similar magnet or electromagnet could be used. Touching magnet 406 to the housing at location 411 or bringing it within close proximity to the location 411 activated the magnetically activated switch 211a and was observed to instantly erase an image on the cholesteric liquid crystal display 201a as seen on the screen 401. While the magnet alone could be used to activate the magnetically activated switch 211a and erase an image, the magnet was, for convenience purposes, placed on the stylus 404 of FIG. 4B. The magnet 406 was placed on the opposite end from the pointed writing tip 405 of the stylus 404. Unlike prior art technology, a written image on the modified Boogie Board Dash™ eWriter could not be accidentally erased by normal handling. The eWriter 400a cannot be erased without the use of a magnet and the image can remain on the eWriter indefinitely. However, if the magnet was brought in close proximity to or touched to the eWriter at housing location 411, the image was instantly erased.

Many modifications and variations of the disclosed embodiments will be apparent to those of ordinary skill in the art in light of the foregoing disclosure. Therefore, it is to be understood that, within the scope of the appended claims, the invention can be practiced otherwise than has been specifically shown and described.

What is claimed is:

1. A writing device comprising:
   a liquid crystal layer including cholesteric liquid crystal material;
   electrically conductive layers between which said liquid crystal layer is disposed;

a flexible substrate and a back substrate between which said electrically conductive layers and said liquid crystal layer are disposed;

wherein application of pressure to said flexible substrate changes a texture of said cholesteric liquid crystal material to form an image;

magnetically activated electronic circuitry for applying an erase voltage to said electrically conductive layers, wherein said magnetically activated electronic circuitry includes a magnetically activated switch; and a magnet which when brought in proximity to said magnetically activated switch, erases the image.

2. The writing device of claim 1 wherein said flexible substrate is transparent.

3. The writing device of claim 1 wherein said back substrate is opaque or semitransparent.

4. The writing device of claim 1 wherein said back substrate is flexible.

5. The writing device of claim 1 wherein said back substrate is transparent.

6. The writing device of claim 1 including a light absorbing layer disposed adjacent to said back substrate.

7. The writing device of claim 6 whereby said light absorbing layer is opaque or semitransparent.

8. The writing device of claim 1 wherein said magnet is untethered and external relative to said flexible substrate.

9. The writing device of claim 8 including a hand held device to which said magnet is attached or forms a part thereof.

10. The writing device of claim 9 wherein said hand held device is a stylus.

11. The writing device of claim 8 comprising a housing that conceals said magnetically activated electronic circuitry.

12. The writing device of claim 11 wherein said magnetically activated electronic circuitry is activated by said magnet touching or brought in proximity to said housing.

13. The writing device of claim 11 wherein magnetically activated electronic circuitry is activated by said magnet touching or brought in proximity to said flexible substrate.

14. The writing device of claim 1 wherein said magnet is a permanent magnet.

15. The writing device of claim 1 wherein said magnet is an electromagnet.

16. The writing device of claim 1 wherein said cholesteric liquid crystal material includes polymer dispersed cholesteric liquid crystal.

17. The writing device of claim 1 comprising
a second liquid crystal layer including cholesteric liquid crystal material stacked relative to said liquid crystal layer;

second electrically conductive layers between which said second liquid crystal layer is disposed;

said magnetically activated electronic circuitry applying said erase voltage to said second electrically conductive layers.

18. A writing device comprising:
a liquid crystal layer including cholesteric liquid crystal material;

electrically conductive layers between which said liquid crystal layer is disposed;

a flexible substrate and a back substrate between which said electrically conductive layers and said liquid crystal layer are disposed;

wherein application of pressure to said flexible substrate changes a texture of said cholesteric liquid crystal material to form an image;

a magnet; and magnetically activated electronic circuitry for applying an erase voltage to said electrically conductive layers;

wherein said magnetically activated electronic circuitry comprises:
a magnetically activated switch that is activated by proximity to said magnet; and erase electronics that are activated by said magnetically activated switch;

wherein moving said magnet in proximity to said magnetically activated switch results in an electrical signal that activates said erase electronics, and said activated erase electronics provide said erase voltage to said electrically conductive layers.

19. The writing device of claim 18 comprising a stylus having a writing tip on one end and said magnet disposed on another opposite end.

* * * * *